United States Patent [19]

Chiu et al.

[11] 4,263,671

[45] Apr. 21, 1981

[54] SAMPLING CLOCK CORRECTION CIRCUIT

[75] Inventors: Ran F. Chiu, Miami; Henry H. Parrish, Miami Springs; Philip F. Kromer, III, Coral Gables; Ming L. Kao, Miami, all of Fla.

[73] Assignee: Racal-Milgo, Inc., Miami, Fla.

[21] Appl. No.: 952,831

[22] Filed: Oct. 19, 1978

[51] Int. Cl.³ .................... H03K 5/159; H04L 25/08
[52] U.S. Cl. .................................. 375/15; 375/102; 375/103; 375/118; 364/724
[58] Field of Search ................ 325/42, 324; 328/72, 328/155; 178/69.1, 69 A; 364/724; 333/18; 375/14, 15, 118, 102, 103; 455/303

[56] References Cited

U.S. PATENT DOCUMENTS

| | | | |
|---|---|---|---|
| 4,028,626 | 6/1977 | Motley et al. | 325/42 |
| 4,071,827 | 1/1978 | Koike et al. | 325/42 |
| 4,146,840 | 3/1979 | McRae et al. | 178/69.1 |

*Primary Examiner*—Benedict V. Safourek
*Attorney, Agent, or Firm*—Jackson, Jones & Price

[57] ABSTRACT

A circuit for maintaining proper sampling timing in a data modem wherein main channel equalizer error is correlated with a derivative channel signal to drive a clock correction signal. The derivative channel signal is derived from an equalizer using fewer coefficients than required to derive the main channel equalized signal, and calculation of the equalized derivative and clock correction signal is performed only once every other Baud.

22 Claims, 4 Drawing Figures

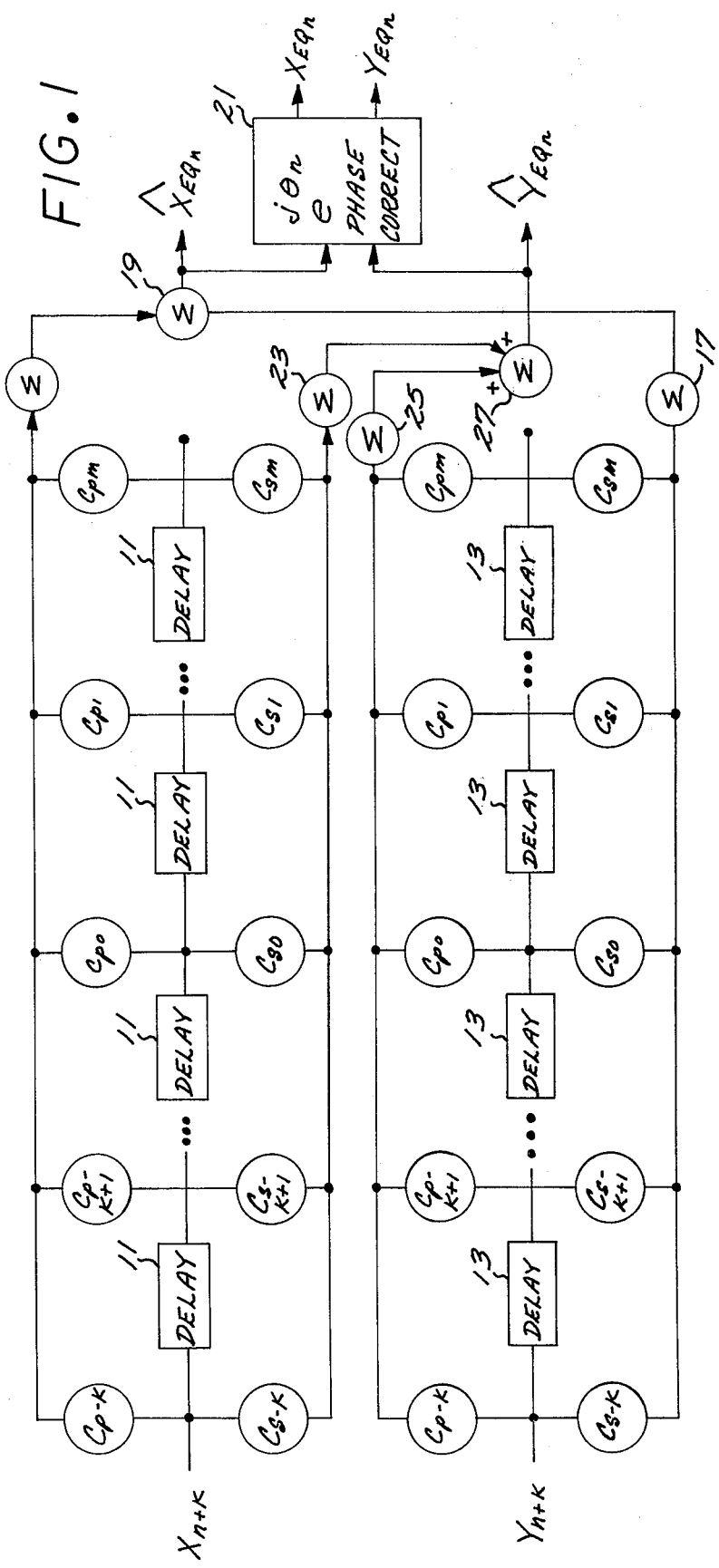

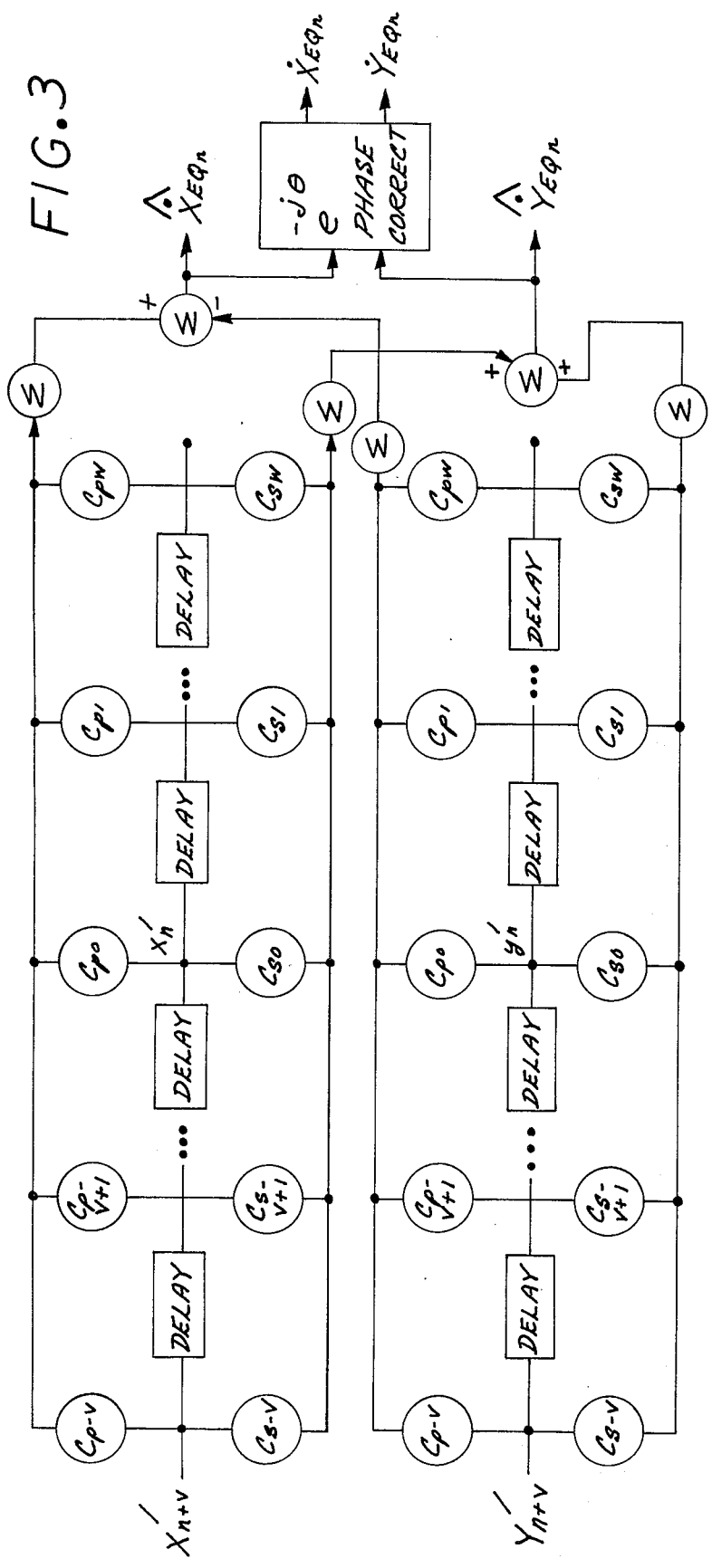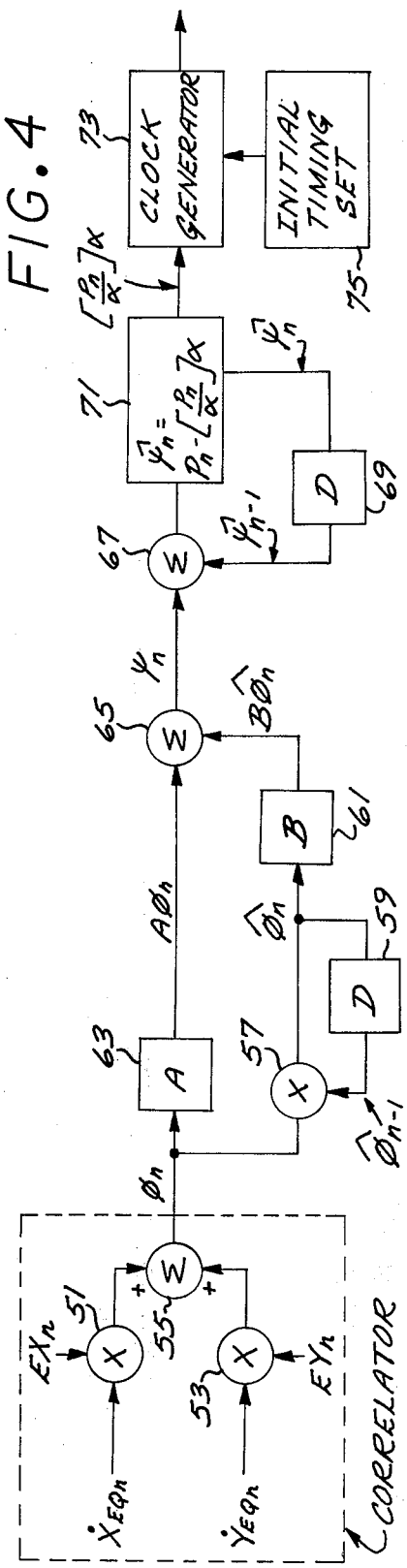

SAMPLING CLOCK CORRECTION CIRCUIT

BACKGROUND OF THE INVENTION

The subject invention relates to data communication apparatus and, more particularly, to an improved circuit for adjusting the timing of a sampling clock typically used to recover data in the receiver of a data modem. Precise adjustment of the sampling clock is essential to optimum recovery of data.

In the prior art, it has been suggested to derive a clock correction signal by correlating so-called main channel error signals and derivative channel signals. The derivative channel signal is derived by differentiating the main channel (received) signal. According to this suggestion, the derivative channel signals must be determined every baud interval and must be equalized by a second equalizer identical to the equalizer employed to equalize the main channel signal. Furthermore, the technique assumes that the sampling clock has already been set to near the correct sampling point. While theoretically interesting, this prior art technique has not appeared practically implementable because of the complexity involved, such as in providing a second equalizer identical to that utilized to equalize the received signal. The prior art technique proves particularly undesirable in modems employing microprocessor techniques because of the excessive number of operations required, which waste valuable microprocessor computation power.

SUMMARY OF THE INVENTION

Accordingly, it is an object of the invention to provide an improved technique for properly adjusting the sampling point of a sampling clock employed in a data modem.

It is a further object of the invention to provide a practically implementable sampling clock correction circuit which employs correlation of a main channel error signal and a second channel signal.

It is yet another object of the invention to provide such a sampling clock correction circuit implementable in a microprocessor modem design.

According to the subject invention, the number of operations necessary to perform sampling clock correcting functions is dramatically reduced by the discovery that it is not necessary to completely equalize the second channel signal, and that the equalized second signal need not be determined every baud interval. Furthermore, the subject invention employs an initial phase estimate based on the signal envelope to initially estimate the positioning of the sampling clock and establishes that such an estimate is sufficient to enable employment of the precise adjustment technique employed. This initial estimate proves very important in that otherwise very poor system performance may result. Employment of a second order phase lock loop to compensate for frequency offset provides a further improvement according to the invention.

BRIEF DESCRIPTION OF THE DRAWINGS

FIG. 1 is a schematic diagram of a portion of a main channel distortion removing apparatus including a main channel equalizer according to the preferred embodiment of the invention.

FIG. 2 is a schematic diagram of the remainder of the apparatus of FIG. 1.

FIG. 3 is a schematic diagram of a second channel distortion removing apparatus including a second channel equalizer according to the preferred embodiment.

FIG. 4 is a schematic diagram of correlation and phase lock structure for producing a timing correction signal according to the preferred embodiment.

DETAILED DESCRIPTION OF THE PREFERRED EMBODIMENT

In the preferred embodiment of the invention, a main channel equalizer illustrated in FIG. 1 and FIG. 2 is employed to generate main channel error signals $EX_n$ and $EY_n$. The main channel equalizer structure of FIG. 1 and FIG. 2 is well known in the art, and is illustrated in brief schematic form.

Input samples $X_{n+K}$ and $Y_{n+K}$ of the main channel received signal, having a phase quadrature relationship, are employed. Initially it is necessary to set the sampling point near the appropriate point in order to enable proper operation of the preferred embodiment. Such initial setting of the sampling clock may be achieved by known envelope recovery methods or by the preferred technique disclosed in the copending application of the inventors U.S. Ser. No. 900,265, entitled Fast Learn Digital Adaptive Equalizer, filed Apr. 26, 1978 and assigned to Racal-Milgo, Inc., herein incorporated by reference. Once the timing of the sampling clock has been initially set, the preferred embodiment will proceed to precisely locate the sampling time in order to optimize data recovery.

The equalizer of FIG. 1 includes an in-phase channel for the $X_{n+K}$ samples, and a quadrature phase channel for the $Y_{n+K}$ samples. The samples $X_{n+K}$ are stored in delay elements 11 and the samples $Y_{n+K}$ are stored in delay elements 13. The inphase channel samples $X_{n+K}$ are multiplied by respective constants $CP_{-K} \ldots CP_m$ and summed in a summer 15. The samples $Y_{n+K}$ are also multiplied by respective constants $CS_{-K} \ldots CS_m$ and summed in a summer 17. The outputs of the two summers 15 and 17 are summed by a summer 19 to provide the signal $\hat{X}_{EQn}$. The output of the summer 19 $\hat{X}_{EQn}$ is fed to a phase correction circuit 21. Similarly, the samples $X_{n+K}$ are multiplied by respective constants $CS_{-K} \ldots CS_m$ and the resulting products are summed in a summer 23. The samples $Y_{n+K}$ are multiplied by respective constants $CP_{-K} \ldots CP_m$ and the resulting products are summed in a summer 25. The respective outputs of the two summers 23, 25 are summed by a summer 27 to produce the signal $\hat{Y}_{EQn}$. This signal $\hat{Y}_{EQn}$ is then fed to the phase correcting circuit 21. The output $X_{EQn}$, $Y_{EQn}$ of the phase correcting circuits are the equalized main channel signal components:

$$X_{EQn} = \hat{X}_{EQn} \cos \theta_n + \hat{Y}_{EQn} \sin \theta_n$$

$$Y_{EQn} = \hat{Y}_{EQn} \cos \theta_n - \hat{X}_{EQn} \sin \theta_n$$

where $\theta_n$ represents the necessary phase angle correction.

The phase corrected equalized main channel signals $X_{EQn}$ and $Y_{EQn}$ are then fed to respective decision circuits 29, 31 (FIG. 2). Each decision element 29, 31 decides the correct value of the output data signal $DX_n$, $DY_n$ from the respective raw outputs $X_{EQn}$, $Y_{EQn}$ of the equalizer. The data signal values $DX_n$, $DY_n$ are then fed to the respective summers 33, 35 from which the main channel in-phase error component $EX_n$ and the main channel quadrature phase error component $EY_n$ are derived.

As known in the prior art, the equalizer constants $CP_{-K}$ and $CS_{-K}$, etc., are adjusted according to some algorithm in order to produce equalized output signals to remedy the effects of intersymbol interference. Such algorithms are well known in the art and will not be discussed further herein.

FIG. 3 discloses the second channel equalizer of the preferred embodiment which in the preferred embodiment is a derivative channel equalizer. Generation of the input signal $X'_{n+v}$, $Y'_{n+v}$ to the derivative channel equalizer is very well known. For example, if $X_n$ and $Y_n$ are the sampled in-phase and quadrature phase baseband signals, then $X'_n$ and $Y'_n$ are the corresponding sampled derivatives of these baseband signals. These samples are then fed to the respective delay elements 15, 17 of the equalizer, shown in FIG. 3, which differs in structure from the equalizer of FIG. 1 in the sole but significant respect that, according to the invention, the number of taps and tap constants $CP_{-V} \ldots CP_W$ and $CS_{-V} \ldots CS_W$ in FIG. 3 is less than the number of taps required by the equalizer of FIG. 1 to equalize the main channel received signal. The values of the tap constants CP, CS for corresponding taps of FIG. 1 and FIG. 3 are the same. By using fewer taps, i.e., $V \leq K$, $W < M$ or $V < K$, $W \leq M$, the derivative signals $\dot{X}_{EQn}$ and $\dot{Y}_{EQn}$, are not as precisely calculated and are typically in error to an extent not tolerable in the main channel received signal. However, according to the invention, it has been found that high accuracy is not required in these signals, whereas high accuracy is required in the output data $DX_n$ and $DY_n$. As a particular example, in a modem constructed according to the preferred embodiment, main tap to derivative tap numbers of 23 to 17, 30 to 19 and 39 to 26 were found to provide accurate operation.

Moreover, according to the invention, it has also been found unnecessary to determine the signal $\dot{X}_{EQn}$ and $\dot{Y}_{EQn}$ every baud. In the preferred embodiment these values and hence the values of $\dot{X}_{EQn}$ and $\dot{Y}_{EQn}$ are calculated once every other baud only, using a subset of the tap constants determined for the main channel equalizer of FIG. 1.

The correlation and phase lock structure employed to utilize these approximately-calculated derivative signals $\dot{X}_{EQn}$ and $\dot{Y}_{EQn}$ is illustrated in FIG. 4. The derivative signals $\dot{X}_{EQn}$ and $\dot{Y}_{EQn}$ are multiplied together with the respective error components of the main channel $EX_n$ and $EY_n$ in the respective multipliers 51, 53. The respective products $EX_n \dot{X}_{EQn}$ and $EY_n \dot{Y}_{EQn}$ are then summed in a summer 55 to produce a signal $\phi_n$ representative of the clock error.

The output $\phi_n$ of the correlator is then applied to a second order loop filter. The second order loop filter includes summers 57, 65 a delay element 59, and constant multipliers 61, 63. The output of summer 57 is denoted $\hat{\phi}_n$ and is delayed by the delay element 59 whose output is fed back as one input to the summer 57. The summer 57 sums $\phi_n$ with the delayed value $\hat{\phi}_{n-1}$ provided by the delay element 59 to provide $\hat{\phi}_n$. The multiplier 61 multiplies $\hat{\phi}_n$ by a loop constant B. A multiplier 63 also multiplies $\phi_n$ by a loop constant A to produce $A\phi_n$. The loop constants A and B are chosen according to well-known phase lock loop design considerations. A summer 65 then sums $A\phi_n$ and $B\hat{\phi}_n$ and produces an output $\psi_n$. The elements 57, 59 and 61 cooperate to provide a second order loop characteristic and eliminate frequency offset between transmitter and receiver clocks.

Another summer 67 forms an output $P_n = \psi_n + \hat{\psi}_{n-1}$ by summing one input $\psi_n$ with the output $\hat{\psi}_{n-1}$ of a delay element 69. The output $P_n$ is fed to a decision block 71 where $[P_n/\alpha] \cdot \alpha$ is determined. The constant $\alpha$ is the smallest adjustment increment or decrement that can be made to the sample clock phase with the given hardware comprising a clock generator 73, and $[P_n/\alpha]$ represents the integer portion of $P_n$ divided by $\alpha$. Thus, $[P_n/\alpha] \cdot \alpha$ provides an integer number of increments or decrements for sample timing correction.

The remainder or non integer portion is determined by the quantity $\hat{\psi}_n = P_n - [P_n/\alpha] \cdot \alpha$. This remainder portion $\hat{\psi}_n$ is stored in the delay element 69 and combined with the next input to the summer 67 in order to provide more accurate sampletime adjustments.

As may be appreciated, since equalized derivative values $\dot{X}_{EQn}$ and $\dot{Y}_{EQn}$ are provided only once every other baud, the circuitry of FIG. 4 need only operate on a once per every other baud timing basis. Thus, the subscripts "n" as used in FIG. 4 indicate the value of the corresponding variable during one particular alternate baud period.

The preferred embodiment just described is admirably suited for a microprocessor modem environment where computation power is at a premium. By utilizing fewer taps, the number of multiplications and summations necessary to calculate $\dot{X}_{EQn}$ and $\dot{Y}_{EQn}$ are significantly reduced. By further limiting the calculations to once every other baud, the number of calculations is effectively cut in half. As a consequence of the preferred embodiment, the number of calculations required to implement FIG. 4 is also cut in half. All of these savings are made at no significant sacrifice to the ultimate accuracy of the timing correction provided.

As will be apparent to those skilled in the art, many modifications and adaptations of the just described preferred embodiment may be made without departing from the scope and spirit of the invention. Therefore, it is to be understood that, with the scope of the appended claims, the invention may be practiced other than as specifically described herein.

What is claimed is:

1. In a data modem having a main channel for receiving a main channel line signal, a means for generating and initially approximately timing a sampling signal for use in sampling said line signal and responsive to a correction signal for adjusting the phase of said sampling signal, and a means for producing a second channel signal as a function of said main channel signal, the apparatus comprising:

means for removing distortion from said main channel signal to produce a corrected output signal including an equalizer means having a plurality of adjustable multiplying coefficients, and a means for producing an error signal indicative of the difference between the corrected and ideal output signal;

means including an equalizer means having a number of multiplying coefficients for removing distortion from said second channel signal to produce a corrected second channel signal; and means for correlating said corrected second channel signal with said error signal to derive a correction signal for correcting the timing phase of said sampling signal.

2. The data modem of claim 1 wherein said means for correlating comprises:

means for deriving a phase error signal by correlating said second channel signal and said error signal;

means for removing frequency offset from said phase error signal to produce a frequency adjusted phase error signal; and means for determining from said adjusted phase error signal the number of increments of timing phase correction to be made.

3. The apparatus of claim 1 wherein said number of multiplying coefficients is less than said plurality.

4. The apparatus of claim 1 or 3 wherein said number is utilized less than once per baud period to generate said corrected second signal.

5. The apparatus of claim 1 wherein said error signal includes first and second components and wherein said corrected second channel signal includes first and second components.

6. The apparatus of claim 5 wherein said correlating means includes a means for multiplying said first component of said error signal by said first component of said corrected second channel signal to form a first product, for multiplying said second component of said error signal by said second component of said corrected second channel signal to form a second product and for summing said first and second products to form a phase adjustment signal.

7. The apparatus of claim 6 further including:
means for second order filtering said phase adjustment signal to produce a corrected signal, and
means for dividing said corrected signal by a clock correction increment to determine a precise adjustment increment for said sampling clock.

8. The apparatus of claim 7 wherein said second order filtering means comprises:
a first summer;
means for multiplying said phase adjustment signal by a constant to provide a first input to said first summer;
a second summer having an output and receiving said phase adjustment signal as one input and a delayed version of said output as a second input; and
means for multiplying said output by a second constant to provide a second input to said first summer.

9. The apparatus of claim 7 wherein said dividing means further includes means for delaying the remainder of said dividing and adding the delayed remainder to said corrected signal.

10. The apparatus of claim 1 wherein said means for producing a second channel signal produces said second channel signal as a derivative of said main channel signal.

11. In a data modem, the apparatus for providing a timing correction signal comprising:
means for producing first and second components of said main channel signal;
means for removing distortion from said first and second main channel signal components to produce corrected first and second main channel signal components;
means for deriving first and second main channel error components from said corrected first and second main channel signal components;
means for producing first and second derivative components of said main channel signal;
means for removing distortion from said first and second derivative components to produce first and second corrected derivative signal components; and means for correlating said first and second corrected derivative signal components with said first and second main channel error components to derive said timing correction signal.

12. The apparatus of claim 11 wherein said means for removing distortion from said main channel signal components includes means for equalizing the first and second main channel signal components utilizing a plurality of equalizer coefficients and wherein the means for removing distortion from said first and second derivative components includes means for equalizing the first and second derivative channel components utilizing a number of equalizer coefficients less than said plurality.

13. The apparatus of claim 11 wherein the means for removing distortion from said first and second derivative components includes means for equalizing said components utilizing a plurality of equalizer coefficients and wherein said coefficients are calculated less than once per baud.

14. In a data modem, the method of providing a timing correction signal comprising the steps of:
deriving a second channel signal from said main channel signal;
removing distortion from said main channel signal to provide a corrected main channel output;
producing an error signal which represents the difference between the actual corrected main channel output and the ideal value thereof;
removing distortion from the second channel signal to provide a corrected second channel signal; and
correlating said corrected second channel signal and said error signal to derive said timing correction signal.

15. The method of claim 14 wherein a plurality of equalizer coefficients are used in removing distortion from said main channel signal and wherein a number of equalizer coefficients less than said plurality are utilized in removing distortion from said second channel signal.

16. The method of claim 14 or 15 wherein the equalizer coefficients used in removing distortion from said second channel signal are calculated less than once per baud period.

17. The method of claim 14 or 15 wherein the equalizer coefficients used in removing distortion from said second channel signal are calculated every other baud period.

18. The method of claim 14 wherein said second channel signal is produced by differentiating said main channel signal.

19. In a data modem, the method of providing a timing correction signal for a sampling signal comprising the steps of:
producing a second channel signal which is a derivative of said main channel signal;
removing distortion from said main channel signal to provide a corrected main channel output;
producing an error signal which represents the difference between the actual main channel output and the ideal value thereof;
removing distortion from the second channel signal to provide a corrected second channel signal, said corrected second channel signal being determined with less accuracy than said corrected main channel signal; and
correlating said corrected second channel signal and said error signal to derive said timing correction signal.

20. In a data modem, the method of providing a timing correction signal for a sampling signal used to sample a main channel signal comprising the steps of:
- producing first and second components of said main channel signal;
- removing distortion from said first and second main channel signal components to produce corrected first and second main channel signal components;
- deriving first and second main channel error components from said corrected first and second main channel signal components;
- producing first and second derivative components of said main channel signal;
- removing distortion from said first and second derivative components to produce first and second corrected derivative components; and
- correlating said first and second corrected derivative components with said first and second main channel error components to derive said timing correction signal.

21. The method of claim 20 wherein the step of removing distortion includes the step of equalizing the first and second main channel signal components utilizing a plurality of equalizer coefficients and wherein the step of removing distortion from said first and second derivative components includes the step of equalizing the first and second derivative channel components utilizing a number of equalizer coefficients less than said plurality.

22. The method of claim 20 wherein the step of removing distortion from said first and second derivative components includes the step of equalizing said components utilizing a plurality of equalizer coefficients and wherein said coefficients are calculated less than once per baud.

* * * * *